Feb. 20, 1962 W. M. HUTCHINSON ET AL 3,022,206
MANUFACTURE OF SOLID PROPELLANT
Filed July 21, 1958 2 Sheets-Sheet 1

INVENTORS
W.M. HUTCHINSON
C.G. LONG
BY Hudson and Young
ATTORNEYS

Feb. 20, 1962   W. M. HUTCHINSON ET AL   3,022,206
MANUFACTURE OF SOLID PROPELLANT
Filed July 21, 1958   2 Sheets-Sheet 2

INVENTORS
W. M. HUTCHINSON
C. G. LONG
BY Hudson and Young
ATTORNEYS

United States Patent Office 3,022,206
Patented Feb. 20, 1962

3,022,206
MANUFACTURE OF SOLID PROPELLANT
William M. Hutchinson and Claude G. Long, Bartlesville, Okla., assignors to Phillips Petroleum Company, a corporation of Delaware
Filed July 21, 1958, Ser. No. 750,035
3 Claims. (Cl. 149—60)

This invention relates to the manufacture of solid propellants for use in rockets and related gas generating devices. In one aspect, this invention relates to a process control for maintaining the burning rate of the propellant within defined limits. In another aspect, this invention relates to a means for determining the burning rate of the propellant as it is processed through a determination of the electrical resistance of the propellant.

Superior rocket fuel grains comprising a solid oxidizer such as ammonium nitrate or ammonium perchlorate, and a rubbery binder material such as a copolymer of butadiene and a vinylpyridine or other substituted heterocyclic nitrogen base compound, which after incorporation is cured by a quaternization reaction or a vulcanization reaction, are described in copending application Serial No. 284,447, filed April 25, 1952, by W. B. Reynolds and J. E. Pritchard.

In the production of such solid rocket fuel grains, it is desirable that the binder component be cured so that the resulting rocket fuel grains will have good mechanical properties such as high values of elongation and tensile strength and low values of modulus of elasticity.

A simplified rocket propellant composition is disclosed in copending application Serial No. 574,041, filed March 26, 1956, by Barney W. Williams et al., wherein the propellant composition consists essentially of a solid oxidizer, a burning rate catalyst and a binder composed of a rubbery copolymer of a conjugated diene and a heterocyclic nitrogen base.

It has also been discovered that the burning rate of propellants comprising a rubber binder and a solid oxidizer, can be markedly increased by mixing the oxidizer and binder under conditions such that the resulting composition is relatively "hard" a measured, for example, by the Shore D hardness method. The "hard" propellants are obtained by milling a relatively hard mixture comprising a rubbery binder and a solid oxidizer, between closely spaced surfaces having a differential motion. A composition which will harden during milling can be obtained in various ways such as by omitting the plasticizer or increasing the carbon black content of the propellant mixture. This process is more fully described in copending application Serial No. 742,432 filed June 16, 1958, by E. D. Guth and C. G. Long.

A major problem which has existed in the manufacture of solid propellants is that of maintaining the burning rate of the propellant within close limits in either batch or continuous production methods. It is necessary to achieve reproducibility of burning rate in the manufacture of rocket propellants because burning rate affects the magnitude and duration of thrust, and the pressure in the combustion chamber. The chamber wall must have sufficient strength to withstand the maximum pressure anticipated and yet avoid excess weight. The present invention provides a method and means for accurately and quickly determining the burning rate of a solid propellant and is applicable to either batch-type or continuous production methods and therefore enables control of burning rate by change in duration or intensity of mixing.

It is therefore an object of this invention to provide a means for determining and controlling the burning rate characteristics of a solid propellant during its manufacture. It is also an object of this invention to provide a method for determining and controlling the burning rate of a solid propellant by determining and controlling its electrical resistance. The provision of a means for determining the electrical resistance of a solid propellant coupled with a means for maintaining the resistance, during processing, within a predetermined range is also an object of this invention. Other objects and advantages of the invention will be apparent to one skilled in the art upon studying this disclosure, including the detailed description and the appended drawing wherein:

Boadly the invention contemplates controlling the burning rate of a solid propellant comprising a solid oxidizer and a rubbery binder by controlling the degree or duration of mixing of the components of the propellant composition so as to maintain the electrical resistivity of the propellant composition within predetermined limits. We have found that the electrical resistance, or alternatively the conductivity, of the composition changes during the preparation of the propellant and as the resistance of the material increases during mixing the components of the propellant composition, the burning rate of the finished propellant increases. We have utilized this correlation of electrical resistance and burning rate of the finished propellant as a means for controlling the processing of the propellant so as to maintain the burning rate at or near the desired value.

The invention provides a method and means for measuring the electrical resistivity of a propellant composition during the mixing or milling of the composition and stopping the mixing or milling when the resistivity of the composition corresponds to the desired burning rate of the composition.

The invention will be further understood from the following description of the accompanying drawing showing diagrammatically several forms of apparatus for carrying out the process of the invention.

Figure 1:
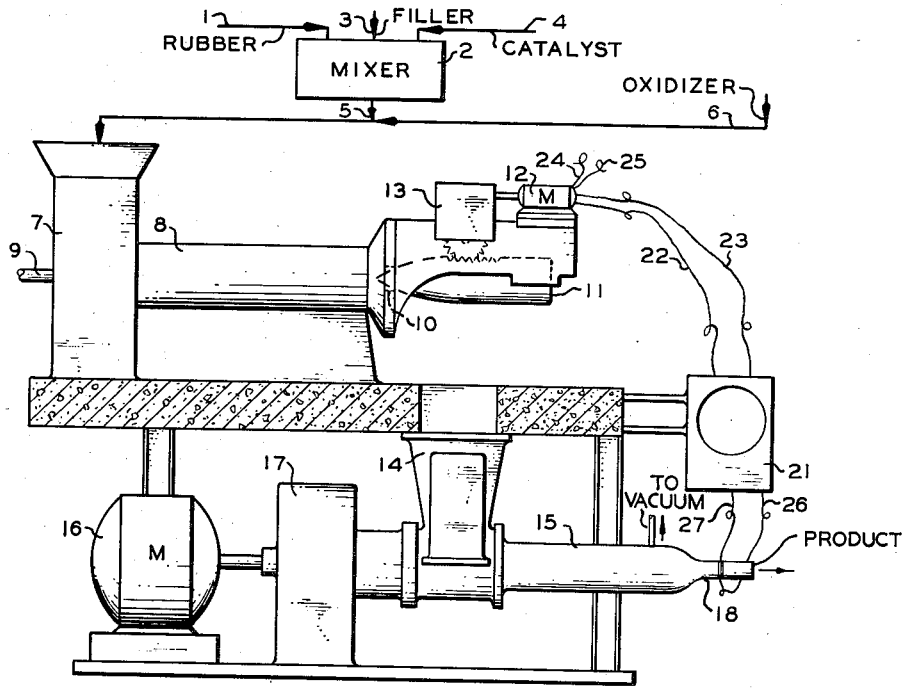
FIGURE 1 illustrates schematically, a system for carrying out the process.

Referring now to FIGURE 1, rubber, which can be natural rubber, synthetic rubber such as GR-S, or a copolymer of a conjugated diene and a heterocyclic nitrogen base, is introduced via conduit 1 to mixer 2 along with a filler, such as carbon black, wood pulp, cellulose materials and the like, via conduit 3 and a burning rate catalyst, such as milori blue or ammonium dichromate via conduit 4. Mixer 2 can be an internal mixer, such as a Banbury or a Baker-Perkins dispersion blade mixer. The mixture of rubber, filler and catalyst together with a solid oxidizer, such as ammonium nitrate which has been dried and ground, is passed via conduits 5 and 6 to the hopper 7 of a second internal mixer indicated as kneader 8. The kneader 8 is operated through shaft 9 connected to a power source (not shown). The degree of mixing obtained in kneader 8 is regulated by the rate of withdrawal of material through orifice 10. Retractable cone 11 projects into orifice 10 so that the effective area of the orifice is the annulus around the point of cone 11 and this is adjusted by projecting the cone into the orifice to decrease the effective orifice size and by withdrawing the cone 11 from orifice 10 to increase the effective orifice size. Control of the rate of withdrawal of material from kneader 8 is accomplished by operation of servo motor 12 through gear box 13 which is operatively connected to retractable cone 11 so as to govern the effective area of orifice 10.

Material removed from kneader 8 passes to the hopper 14 of extruder 15. A knife blade adjacent the top of orifice 10 cuts the tube of material so that a sheet of material gravitates into hopper 14. Extruder 15 is actuated by motor 16 operating through gear box 17. The propellant composition is compacted and deaerated in extruder 15 and is extruded through nozzle 18. Electrodes 19 and 20 are imbedded in nozzle 18 as shown in detail in FIGURES 2 and 3 and are connected to resistance meter, recorder-controller 21 by leads 26 and 27. Servo motor 12 is connected to recorder-controller 21 by electrical lines 22 and 23 and is connected to a power source (not shown) through electrical lines 24 and 25. Recorder-controller 21 is described in more detail with reference to FIGURE 6.

Figure 2:
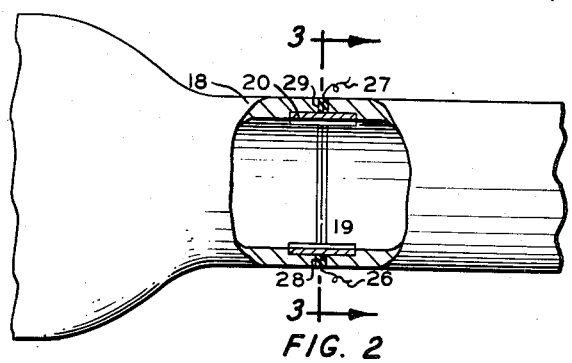
FIGURE 2 is a detailed view, in section, of the electrodes of FIGURE 1.
Figure 3:
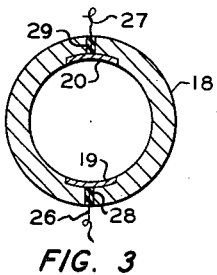
FIGURE 3 is a view of FIGURE 2 along lines 3—3.

FIGURES 2 and 3 illustrate the details of suitable electrode assemblies for continuous or intermittent measurement of the resistivity of the propellant compositions emerging from extruder 15 through nozzle 18. The electrodes 19 and 20 are made of conducting metal such as steel, platinum, brass or silver, and are imbedded in high resistance insulating conduit such as laminated phenolic resin pipe which comprises the nozzle of extruder 15. This pipe can, in turn, be inserted into a steel jacket to strengthen the assembly. The lead wires attached to the electrodes can be insulated from such external metal pipe by use of suitable bushings.

Figure 4:
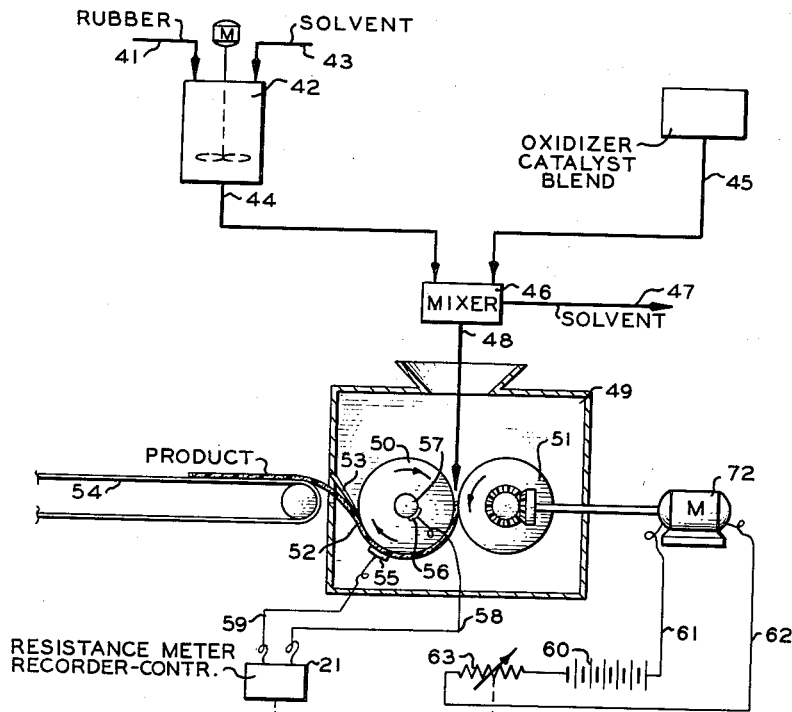
FIGURE 4 is a schematic illustration of another system for carrying out the process of the invention.

Referring now to FIGURE 4 rubber which comprises rubber, curing agents and filler is admitted through line 41 to mixing tank 42 and is dissolved in solvent admitted to mixing tank 42 via conduit 43. Mixing vessel 42 comprises a conventional stirred vessel capable of dispersing the rubber in a rubber solvent. The solution of rubber in solvent is passed via conduit 44 to mixer 46 along with a blend of solid oxidizer such as ammonium nitrate and a burning rate catalyst such as milori blue, admitted to mixer 46 via conduit 45. Mixer 46 can be an internal mixer such as a Banbury or a Baker-Perkins dispersion blade mixer wherein the ingredients are thoroughly mixed so that the rubber binder forms the continuous phase and the oxidizer forms the discontinuous phase in the finished mix. During the mixing the solvent is removed by evaporation via conduit 47. The material passes from mixer 46 via conduit 48 to roll mill 49 for further and final mixing. Roll mill 49 can be a conventional roll mill. Roll mill 49 is illustrated as comprising rollers 50 and 51 although more rollers can be employed as desired. Roller 50 is operated at constant speed by a power source (not shown) and roller 51 is operated by variable speed motor 72. The propellant composition forms a uniform coating 52 on roller 50 and is removed from the mill by means of blade 53 and is recovered by means of conveyor belt 54. Electrode 55 is positioned in electrical contact with the surface of the propellant coating 52 and contact with the propellant coating preferably is made by sliding contact of electrode 55 with propellant composition coating 52. The metal roll 50 provides the second electrode and is connected to resistance meter 21 by means of sliding contact 56 which is shown in sliding contact with the hub 57 of roller 50. Electrodes 50 and 55 are connected to resistance meter 21 by means of lead wires 58 and 59.

Resistance meter-controller 21 is the same as shown in FIGURE 1. Motor 72 is connected to a direct current power source indicated as battery 60 through lead 61, lead 62 and variable resistance 63. Variable resistance 63 is operatively connected to resistance meter-controller 21 by means of linkage 64 so that the controller 21 controls the speed of motor 72 through a determination of the electrical resistance of composition coating 52 of roller 50 so as to increase the speed of motor 72 to increase the burning rate of the composition and decrease the motor speed to decrease burning rate.

Figure 5:
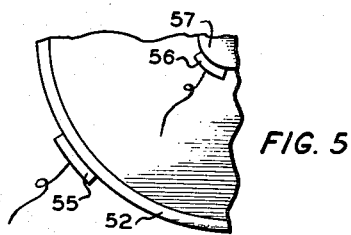
FIGURE 5 is a detailed sectional view of the electrodes of FIGURE 4.

FIGURE 5 shows the sliding electrodes 55 and 56 of FIGURE 4 in more detail.

Figure 6:
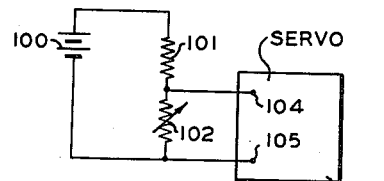
FIGURE 6 illustrates the electrical circuit of the resistance meter controller.

Electronic equipment for recording resistance is available commercially. The recorder-controller 21 of FIGURES 1 and 4 is available commercially and the principal of operation is shown in FIGURE 6 wherein battery 100 is connected through balanced resistances 101 and 102 to servo circuit 103 by means of contacts 104 and 105. Resistance 101 is a fixed resistance and resistance 102 is a variable resistance, indicative of the resistance of the propellant composition between electrodes 19 and 20 of FIGURE 1 and electrodes 55 and 56 of FIGURE 4. The servo circuit 103 is conventional and is illustrated and described in "Electronic Control Handbook" by R. T. Barcher and William Moulic, copyright 1946, published by Caldwell-Clements Inc., 480 Lexington Avenue, New York, New York, at pages 298 to 300. Connections 104 and 105 represent the thermocouple connections in the circuits shown on page 298 and servo motor 12 is the balanced motor of that circuit.

Figure 7:
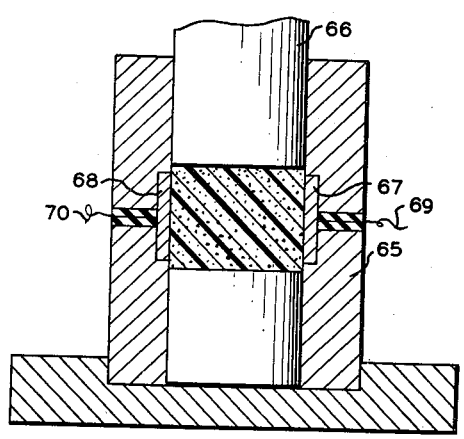
FIGURE 7 illustrates another embodiment of the invention.

FIGURE 7 shows a sectional view of a mold comprising cylinder 65, and piston 66. Cylinder 65 is made of non-conductor composition and electrodes 67 and 68 are imbedded in the wall of the cylinder so as to be in contact with the sample in the mold. Leads 69 and 70 connect the electrodes to a resistance meter such as that represented by 21 in FIGURES 1 and 4. Piston 66 compacts the material in the cylinder 65 of the mold. This device is used when batch operation is practiced and samples of composition are periodically tested so as to control the degree of mixing. The control feature of the resistance meter-controller 21 is not utilized in this embodiment of the invention.

The following specific embodiments of the invention will be helpful in understanding the invention but are not to be construed as limiting the invention since they are exemplary.

EXAMPLE I

A 4,480 gm. batch of propellant composition was made in a 2.25 gallon Baker-Perkins dispersion blade mixer using the solvent mix technique of dissolving the copolymer in methycyclohexane and placing this solution with the rest of the ingredients in the mixer and then removing the solvent during mixing by evacuation. This propellant composition is shown in the following Table I. The copolymer in Table I was 90 parts by weight butadiene-1,3 and 10 parts by weight 2-methyl-5-vinylpyridine.

*Table I*

| | Parts by Weight Per 100 Parts of Copolymer | Parts by Weight | Weight (gm.) |
|---|---|---|---|
| Copolymer | 100 | | 200 |
| Carbon black (7-millimicrons) | 140 | 12 | 280 |
| Ammonium nitrate (40 microns) | | 88 | 3,520 |
| Copper chromite | | 6 | 240 |
| Ammonium dichromate | | 6 | 240 |

Samples of the above composition which weighed 212 grams were milled on a roll mill at 0.009 inch milling gap for varying lengths of time. The milling times of the samples and the measured properties of the milled samples are shown in Table II.

Table II
MILLING TIME AND MEASURED PROPERTIES

| Run Number | Milling time, seconds | Specific resistance, ohm-inches | Burning rate, inches/seconds at 1,000 p.s.i. |
|---|---|---|---|
| 1 | 0 | 2,770 | 0.234 |
| 2 | 5 | 26,600 | 0.244 |
| 3 | 10 | 395,000 | 0.325 |
| 4 | 15 | 1,020,000 | 0.496 |
| 5 | 20 | 1,760,000 | 0.541 |
| 6 | 30 | 1,650,000 | 0.608 |
| 7 | 40 | 1,670,000 | 0.597 |
| 8 | 50 | 1,440,000 | 0.542 |

The resistance measurements recorded in Table II were made on samples which were compression molded to a thickness of 0.1 inch. Specimens were cut from the molded specimens to give a 1″ x 1″ sheet. The sides of the sheet were coated with a conductive silver paint to provide the electrodes for the specimens. The paint was allowed to dry for about one hour in a dehumidified room (relative humidity less than 35 percent) at a temperature of about 80° F. The electrical probes of a resistance meter were contacted on opposite faces of the 1″ x 1″ specimen, and the observed value for the electrical resistance was recorded.

The results presented in Table I show that there is a pronounced increase in the specific resistance in increase in milling time. Also, the burning rate increases to a maximum value, 0.608″ per second, at 30 seconds' milling time. The specific resistance is closely related to the burning rate and can therefore be used as a means for control of the burning rate.

EXAMPLE II

Another batch of propellant composition was made by mixing the ingredients in the dispersion blade mixer using a copolymer as described in Example I. The propellant composition is shown in the following Table III.

Table III

| | Parts by Weight Per 100 Parts of Copolymer | Parts by Weight | Weight Used |
|---|---|---|---|
| Copolymer | 100 | | 422 |
| Carbon black | 40 | 15 | 169 |
| Liquid Polybutadiene [1] | 25 | | 84 |
| Ammonium nitrate | | 85 | 3,925 |
| Milori Blue | | 2 | 90 |
| Ammonium Dichromate | | 4 | 180 |

[1] Liquid polymer of butadiene, prepared by sodium catalyzed polymerization, having an approximate viscosity of 2500 Saybolt Fural Seconds at 100° F.

After the oxidizer was incorporated into the binder the mixing was continued under hydraulic ram pressure of about 6 p.s.i. for the time periods indicated in Table IV below and the properties of samples were measured as in Example I.

Table IV
MILLING TIME AND MEASURED PROPERTIES

| Mixing Time Under Ram After Incorporation, in Mins. | Specific Resistance, ohm inches | Burning Rate, Inches per Second @ 1,000 p.s.i. |
|---|---|---|
| 0 | 13,000,000 | 0.222 |
| 115 | 480,000,000 | 0.246 |
| 225 | 560,000,000 | 0.250 |

The results of Table IV show that the specific resistance and burning rate of a propellant mixed in a dispersion blade mixer also increase with increased mixing time. The specific resistance is closely related to the burning rate and can therefore be used as a means for control of the burning rate.

EXAMPLE III

The practice of this invention is illustrated by the following example. Referring to FIGURE 1, a propellant is prepared using 15 parts by weight of a binder, 2 parts by weight of Milori blue as catalyst and 85 parts by weight of ammonium nitrate. The binder is prepared from the following ingredients shown in Table V.

Table V

| | Parts by weight |
|---|---|
| 90/10 copolymer of butadiene/2-methyl-5-vinyl pyridine [1] | 100 |
| Carbon black | 20 |
| Plasticizer (dibutoxyethoxyethyl formal) | 20 |
| Magnesium oxide | 5 |
| Antioxidant (Flexamine) [2] | 3 |

[1] Mooney (ML-4) value of 20.
[2] A physical mixture of 65 percent of a complex diarylaminoketone product and 35 percent N,N'-diphenyl-p-phenylaminediamine.

The binder and catalyst are blended in a Banbury mixer, extruded, and passed through the extruder and the cutter. The binder is mixed with the ground oxidizer in the ratio stated above. As the mixture evolves from the extruder mixer the resistance is measured using an electrode assembly substantially as shown in FIGURE 1. Propellant initially emerging from the mixer is recycled until stable operation is obtained. When the resistance of the propellant approaches the desired value the recorder-controller is activated and moderates the output rate from the mixer. In this manner the degree of mixing is controlled.

Reasonable variations and modifications are possible within the scope of the disclosure without departing from the spirit and scope of the invention.

That which is claimed is:

1. In the process for preparing a propellant composition comprising a rubber binder and a solid, inorganic oxidizing salt which comprises intimately admixing said binder and said oxidizer, forming the resulting composition into a grain and curing the grain, the improvement which comprises measuring the electrical resistivity of the admixture during the mixing step and regulating the mixing to maintain the resistivity of said admixture within predetermined limits thereby maintaining the burning rate of the propellant composition within predetermined limits.

2. In the process of preparing a propellant composition comprising a binder of a copolymer of a conjugated diene and a polymerizable heterocyclic nitrogen base and ammonium nitrate oxidizer which comprises intimately admixing said binder and oxidizer, forming the composition into a grain and curing the grain, the improvement which comprises periodically measuring the electrical resistance and duration of the materials being mixed and regulating the degree of mixing so as to maintain the resistivity of the resulting admixture within predetermined limits thereby maintaining the burning rate of the finished propellant composition within predetermined limits.

3. In the process of preparing a propellant composition comprising a rubbery binder and a solid, inorganic oxidizing salt wherein the binder and oxidizer are intimately admixed and then milled by being passed between closely spaced surfaces having differential motion, the improvement which comprises measuring the electrical resistivity of the milled admixture and regulating the degree of milling so as to maintain the resistivity of said admixture within predetermined limits.

References Cited in the file of this patent
UNITED STATES PATENTS

| | | |
|---|---|---|
| 2,491,466 | Adams | Dec. 20, 1949 |
| 2,740,702 | Mace | Apr. 3, 1956 |
| 2,742,672 | Thomas | Apr. 24, 1956 |
| 2,783,947 | Hage | Mar. 5, 1957 |
| 2,852,359 | Achilles | Sept. 21, 1958 |
| 2,857,258 | Thomas | Oct. 21, 1958 |

UNITED STATES PATENT OFFICE
CERTIFICATE OF CORRECTION

Patent No. 3,022,206                                   February 20, 1962

William M. Hutchinson et al.

It is hereby certified that error appears in the above numbered patent requiring correction and that the said Letters Patent should read as corrected below.

Column 6, line 53, strike out "and duration" and insert the same after "degree" in line 54, same column 6.

Signed and sealed this 3rd day of July 1962.

(SEAL)
Attest:

ERNEST W. SWIDER                                         DAVID L. LADD
Attesting Officer                                             Commissioner of Patents